United States Patent
Kim

(10) Patent No.: US 11,951,982 B2
(45) Date of Patent: Apr. 9, 2024

(54) LANE FOLLOWING ASSIST APPARATUS AND CONTROL METHOD THEREOF

(71) Applicants: HYUNDAI MOTOR COMPANY, Seoul (KR); KIA CORPORATION, Seoul (KR)

(72) Inventor: Seung Hyun Kim, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 194 days.

(21) Appl. No.: 17/409,447

(22) Filed: Aug. 23, 2021

(65) Prior Publication Data
US 2022/0203977 A1    Jun. 30, 2022

(30) Foreign Application Priority Data
Dec. 24, 2020 (KR) .................. 10-2020-0183846

(51) Int. Cl.
*B60W 30/12* (2020.01)
*G06V 20/56* (2022.01)

(52) U.S. Cl.
CPC ............ *B60W 30/12* (2013.01); *G06V 20/588* (2022.01); *B60W 2420/403* (2013.01); *B60W 2552/53* (2020.02)

(58) Field of Classification Search
CPC ............ B60W 2554/801; B60W 30/12; G06V 20/588; G06T 2207/30256; B60T 2201/08; B60T 2201/081; B60T 2201/085; G01C 21/3658; G01C 21/3819
See application file for complete search history.

(56) References Cited

U.S. PATENT DOCUMENTS

| | | | |
|---|---|---|---|
| 2011/0231062 A1* | 9/2011 | Kim ..................... | B62D 15/025 701/1 |
| 2016/0107682 A1* | 4/2016 | Tan ........................ | B62D 6/00 701/41 |
| 2019/0084619 A1* | 3/2019 | Mizoguchi ........... | G05D 1/0212 |

FOREIGN PATENT DOCUMENTS

KR     101846577 B1    4/2018

* cited by examiner

*Primary Examiner* — Kenneth J Malkowski
(74) *Attorney, Agent, or Firm* — Lempia Summerfield Katz LLC

(57) ABSTRACT

A lane following assist apparatus and a control method thereof are provided. The lane following assist apparatus includes a camera that captures an image in front of a vehicle and a processor that receives a forward image from the camera. The processor obtains line information from the forward image, calculates a vehicle offset based on the line information, variably sets a target look-ahead distance depending on whether the vehicle offset is greater than a threshold, and performs lane following assist control using the target look-ahead distance.

6 Claims, 5 Drawing Sheets

LANE FOLLOWING ASSIST APPARATUS AND CONTROL METHOD THEREOF

CROSS-REFERENCE TO RELATED APPLICATION

This application claims the benefit of priority to Korean Patent Application No. 10-2020-0183846, filed in the Korean Intellectual Property Office on Dec. 24, 2020, the entire contents of which are incorporated herein by reference.

TECHNICAL FIELD

The present disclosure relates to a lane following assist (LFA) apparatus and a control method thereof.

BACKGROUND

A lane following assist (LFA) system assists a vehicle to recognize lines and keep the lane center to travel. The LFA system sets a target look-ahead distance proportional to a vehicle speed on a target route and calculates a target rotation radius for arriving at a point according to the set target look-ahead distance. As such, because the existing LFA system considers only the vehicle speed when calculating the target look-ahead distance, as it uses the same look-ahead distance irrespective of an offset degree to which the vehicle is spaced apart from the target route, an entrance angle is increased.

SUMMARY

The present disclosure has been made to solve the above-mentioned problems occurring in the prior art while maintaining advantages achieved by the prior art.

An aspect of the present disclosure provides a lane following assist apparatus and a control method thereof for varying a target look-ahead distance depending on an offset degree to which a vehicle is spaced apart from a target route and varying a vehicle speed when setting the target look-ahead distance such that the vehicle may always enter the target route at a smooth angle.

The technical problems to be solved by the present disclosure are not limited to the aforementioned problems. Any other technical problems not mentioned herein will be clearly understood from the following description by those having ordinary skill in the art to which the present disclosure pertains.

According to an aspect of the present disclosure, a lane following assist apparatus may include a camera that captures an image in front of a vehicle and a processor that receives a forward image from the camera. The processor may obtain line information from the forward image, may calculate a vehicle offset based on the line information, may variably set a target look-ahead distance depending on whether the vehicle offset is greater than a threshold, and may perform lane following assist control using the target look-ahead distance.

The processor may recognize both lines of a lane from the forward image and may set a lane center to a target route.

The processor may calculate a straight distance between the target route and a center of the vehicle as the vehicle offset.

The processor may calculate the target look-ahead distance using a vehicle speed and a preview time.

The processor may calculate a difference between the vehicle offset and the threshold, when the vehicle offset is greater than the threshold, and may adjust the preview time based on the calculated difference to calculate the target look-ahead distance.

The processor may maintain the preview time to calculate the target look-ahead distance, when the vehicle offset is not greater than the threshold.

The processor may set a target look-ahead distance point using the target look-ahead distance and may generate a target rotation route for arriving at the target look-ahead distance point.

According to another aspect of the present disclosure, a control method of a lane following assist apparatus may include: obtaining line information from a forward image obtained using a camera; calculating a vehicle offset based on the line information; determining whether the vehicle offset is greater than a threshold; variably setting a target look-ahead distance depending on whether the vehicle offset is greater than the threshold; and performing lane following assist control using the target look-ahead distance.

The obtaining of the line information may include recognizing both lines of a lane from the forward image and setting a lane center to a target route.

The calculating of the vehicle offset may include calculating a straight distance between the target route and a center of a vehicle as the vehicle offset.

The variable setting of the target look-ahead distance may include calculating the target look-ahead distance using a vehicle speed and a preview time.

The variable setting of the target look-ahead distance may further include computing a difference between the vehicle offset and the threshold, when the vehicle offset is greater than the threshold, and adjusting the preview time based on the difference between the vehicle offset and the threshold to calculate the target look-ahead distance.

The variable setting of the target look-ahead distance may further include maintaining the preview time to calculate the target look-ahead distance, when the vehicle offset is not greater than the threshold.

The performing of the lane following assist control may include setting a target look-ahead distance point using the target look-ahead distance and generating a target rotation route for arriving at the target look-ahead distance point.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
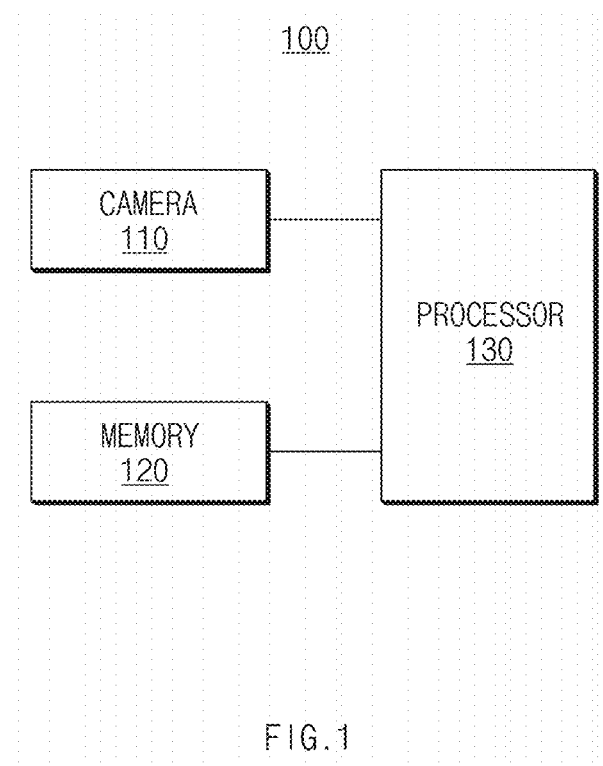
FIG. 1 is a block diagram illustrating a configuration of a lane following assist (LFA) apparatus according to embodiments of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted in order not to unnecessarily obscure the gist of the present disclosure. When a component, device, element, or the like of the present disclosure is described as having a purpose or performing an operation, function, or the like, the component, device, or element should be considered herein as being "configured to" meet that purpose or to perform that operation or function.

In describing the components of the embodiment according to the present disclosure, terms such as first, second, "A", "B", (a), (b), and the like may be used. These terms are merely intended to distinguish one component from another component, and the terms do not limit the nature, sequence, or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings consistent with the contextual meanings in the relevant field of art. Such terms are not to be interpreted as having ideal or excessively formal meanings unless clearly defined as having such in the present application.

FIG. 1 is a block diagram illustrating a configuration of a lane following assist (LFA) apparatus according to embodiments of the present disclosure.

Referring to FIG. 1, an LFA apparatus 100 may include a camera 110, a memory 120, a processor 130, and the like.

The camera 110 may be loaded into a vehicle to capture an image in front of the vehicle. The camera 110 may include at least one of image sensors such as a charge coupled device (CCD) image sensor, a complementary metal oxide semi-conductor (CMOS) image sensor, a charge priming device (CPD) image sensor, and/or a charge injection device (CID) image sensor. The camera 110 may include an image processor for performing image processing, such as noise cancellation, color reproduction, file compression, image quality adjustment, and saturation adjustment, for an image obtained by means of the image sensor.

The memory 120 may store the forward image captured by the camera 110. The memory 120 may store a variety of predetermined setting information, for example, a threshold. The memory 120 may store target look-ahead distance calculation logic, LFA control logic, and/or the like. The memory 120 may be a non-transitory storage medium, which stores instructions executed by the processor 130. The memory 120 may include at least one of storage media such as a flash memory, a hard disk, a secure digital (SD) card, a random access memory (RAM), a static RAM (SRAM), a read only memory (ROM), a programmable ROM (PROM), an electrically erasable and programmable ROM (EEPROM), an erasable and programmable ROM (EPROM), and/or a register.

The processor 130 may control the overall operation of the LFA apparatus 100. The processor 130 may include at least one of an application specific integrated circuit (ASIC), a digital signal processor (DSP), programmable logic devices (PLD), field programmable gate arrays (FPGAs), a central processing unit (CPU), microcontrollers, and/or microprocessors.

The processor 130 may obtain an image in front of the vehicle using the camera 110. The processor 130 may recognize a lane on which the vehicle is traveling, i.e., both lines of the lane from the image in front of the vehicle. The processor 130 may set a target route along the center of the lane using both the recognized lines.

The processor 130 may calculate (compute) a vehicle offset based on the target route. The vehicle offset may be a degree to which the vehicle is spaced apart from the target route, which may be a straight distance between the target route and a vehicle center.

The processor 130 may compute a target look-ahead distance L based on a vehicle offset $|D_{offset}|$. The target look-ahead distance L may be represented as Equation 1 below.

$$L = V \times (Ts + k \times \mathrm{MAX}[(|D_{offset}| - D_{Th}), 0]) \qquad \text{[Equation 1]}$$

Herein, V denotes the vehicle speed, Ts denotes the preview time, k denotes the gain value for variably controlling the preview time, and $D_{Th}$ denotes the threshold. Ts and k may be tuning parameters, which may be previously set to any constants based on a test result. The vehicle speed V may be obtained using a speed sensor, a global positioning system (GPS), and/or the like.

The processor 130 may determine whether the vehicle offset $|D_{offset}|$ is greater than the threshold $D_{Th}$. The processor 130 may variably set a target look-ahead distance point depending on whether the vehicle offset $|D_{offset}|$ is greater than the threshold $D_{Th}$.

As a preview time of the vehicle increases when the vehicle offset $|D_{offset}|$ is greater than the threshold $D_{th}$, the processor 130 may increase a target look-ahead distance. When the vehicle offset $|D_{offset}|$ is greater than the threshold $D_{Th}$, the increased preview time Ts' may be 'Ts+k×($|D_{offset}|-D_{Th}$)'. At this time, the target look-ahead distance $L_{var}$ may be represented as Equation 2 below.

$$L_{var} = V \times (Ts + k \times (|D_{offset}| - D_{Th}) \qquad \text{[Equation 2]}$$

As there is no change in the preview time of the vehicle when the vehicle offset $|D_{offset}|$ is less than or equal to the threshold $D_{Th}$, the processor 130 may maintain the target look-ahead distance of the vehicle. At this time, the target look-ahead distance $L_{var}$ may be represented as Equation 3 below.

$$L = V \times (Ts + 0) \qquad \text{[Equation 3]}$$

In other words, when the vehicle offset $|D_{offset}|$ is less than or equal to the threshold $D_{Th}$, because there is no change in preview time, the processor 130 may compute the target look-ahead distance based on a vehicle speed.

The processor 130 may set a target look-ahead distance point based on the target look-ahead distance.

The processor 130 may perform LFA control of the vehicle using the target look-ahead distance. The processor 130 may generate a target rotation route where the vehicle arrives at the target look-ahead distance point from the current location. In other words, the processor 130 may plan a route to generate a smooth target rotation radius where the vehicle arrives at the target look-ahead distance point. The processor 130 may control a vehicle behavior (e.g., steering, acceleration, deceleration, braking, and the like) such that the vehicle may arrive at the target look-ahead distance point along the target rotation route (i.e., an entrance route where the vehicle arrives at the target look-ahead distance point).

Figure 2:
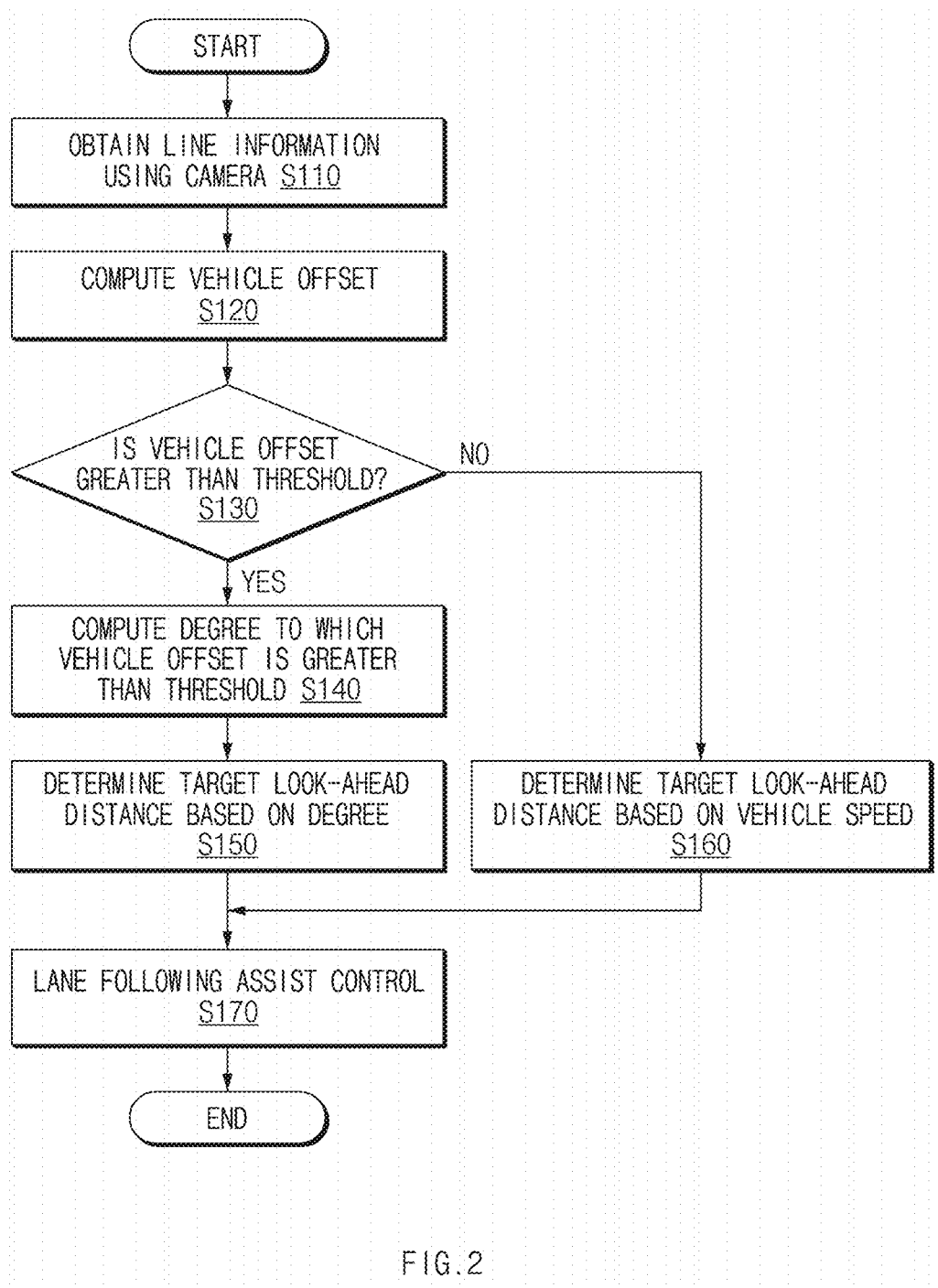
FIG. 2 is a flowchart illustrating a control method of an LFA apparatus according to embodiments of the present disclosure.

FIG. 2 is a flowchart illustrating a control method of an LFA apparatus according to embodiments of the present disclosure.

In S110, a processor 130 of FIG. 1 may obtain line information in front of a vehicle using a camera 110 of FIG. 1. The processor 130 may process a forward image obtained by the camera 110 to recognize both lines of a lane where the vehicle is traveling. The processor 130 may set a target route along the center of both the recognized lines.

In S120, the processor 130 may compute a vehicle offset based on the line information. The processor 130 may calculate a vehicle offset $|D_{offset}|$ which is a degree to which the vehicle is spaced apart from the target route. In other words, the processor 130 may calculate a straight distance between the target route and a vehicle center.

In S130, the processor 130 may determine whether the vehicle offset $|D_{offset}|$ is greater than a threshold $D_{Th}$.

When the vehicle offset $|D_{offset}|$ is greater than the threshold $D_{Th}$ (i.e., when $|D_{offset}|>D_{Th}$), in S140, the processor 130 may compute a degree to which the vehicle offset $|D_{offset}|$ is greater than the threshold $D_{Th}$. The processor 130 may calculate a difference between the vehicle offset $|D_{offset}|$ and the threshold $D_{Th}$.

In S150, the processor 130 may determine a target look-ahead distance L based on the degree to which the vehicle offset $|D_{offset}|$ is greater than the threshold $D_{Th}$. As a preview time increases depending on a difference between the vehicle offset $|D_{offset}|$ and the threshold $D_{Th}$, the processor 130 may increase the target look-ahead distance L.

When the vehicle offset $|D_{offset}|$ is not greater than the threshold $D_{Th}$, in S160, the processor 130 may determine a target look-ahead distance L based on a vehicle speed. When the vehicle offset $|D_{offset}|$ is less than or equal to the threshold $D_{Th}$, because the preview time is maintained without change, the processor 130 may maintain the target look-ahead distance L computed based on the vehicle speed in the same manner as the existing technology.

In S170, the processor 130 may perform LFA control based on the target look-ahead distance L determined in S150 or S160. The processor 130 may perform LFA control to generate a smooth target rotation radius where the vehicle arrives at a target look-ahead distance point.

Figure 3:
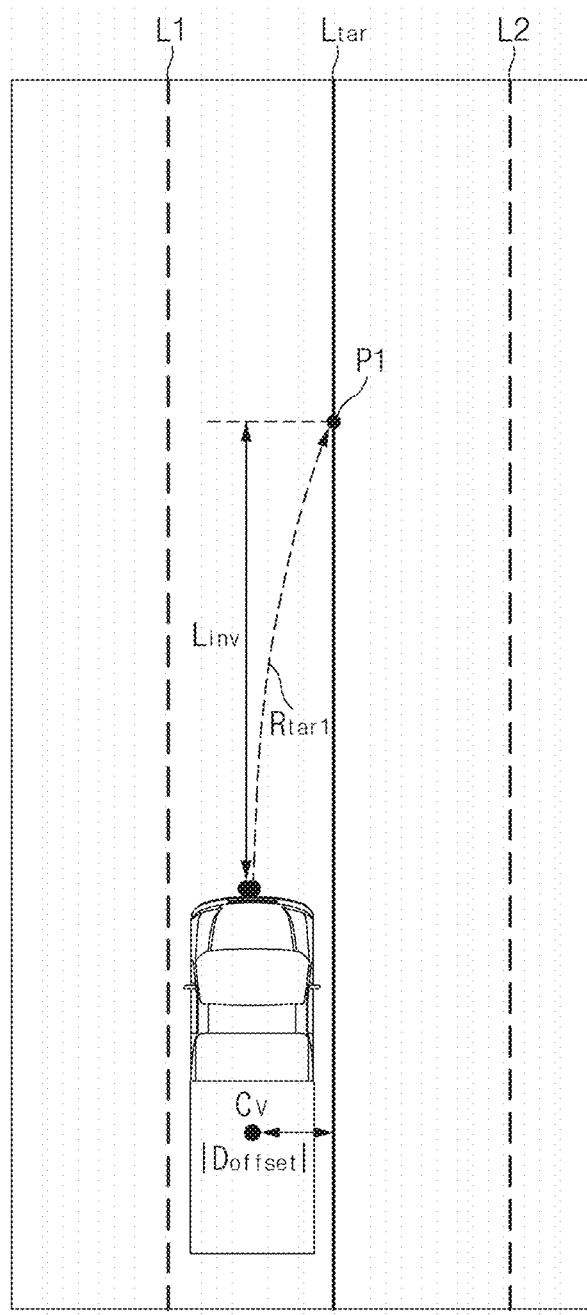
FIG. 3 is a drawing illustrating an example of control of an LFA apparatus according to embodiments of the present disclosure.

FIG. 3 is a drawing illustrating an example of control of an LFA apparatus according to embodiments of the present disclosure.

A processor 130 of FIG. 1 may obtain an image in front of a vehicle using a camera 110 of FIG. 1 and may recognize both lines L1 and L2 of a lane on which the vehicle should travel from the obtained image. The processor 130 may set a target route $L_{tar}$ along the center of both the lines L1 and L2.

The processor 130 may compute a vehicle offset $|D_{offset}|$, which is a distance between the target route $L_{tar}$ and a vehicle center Cv. When the vehicle offset $|D_{offset}|$ is not greater than a threshold, because a previous preview time is maintained, the processor 130 may compute a target look-ahead distance $L_{inv}$ based on a vehicle speed. The processor 130 may set a target look-ahead distance point P1 on the target route $L_{tar}$ based on the target look-ahead distance $L_{inv}$.

The processor 130 may generate a target rotation route $R_{tar1}$ where the vehicle arrives at the target look-ahead distance point P1. Thereafter, the processor 130 may control a behavior (e.g., steering) of the vehicle along the target rotation route $R_{tar1}$.

Figure 4:
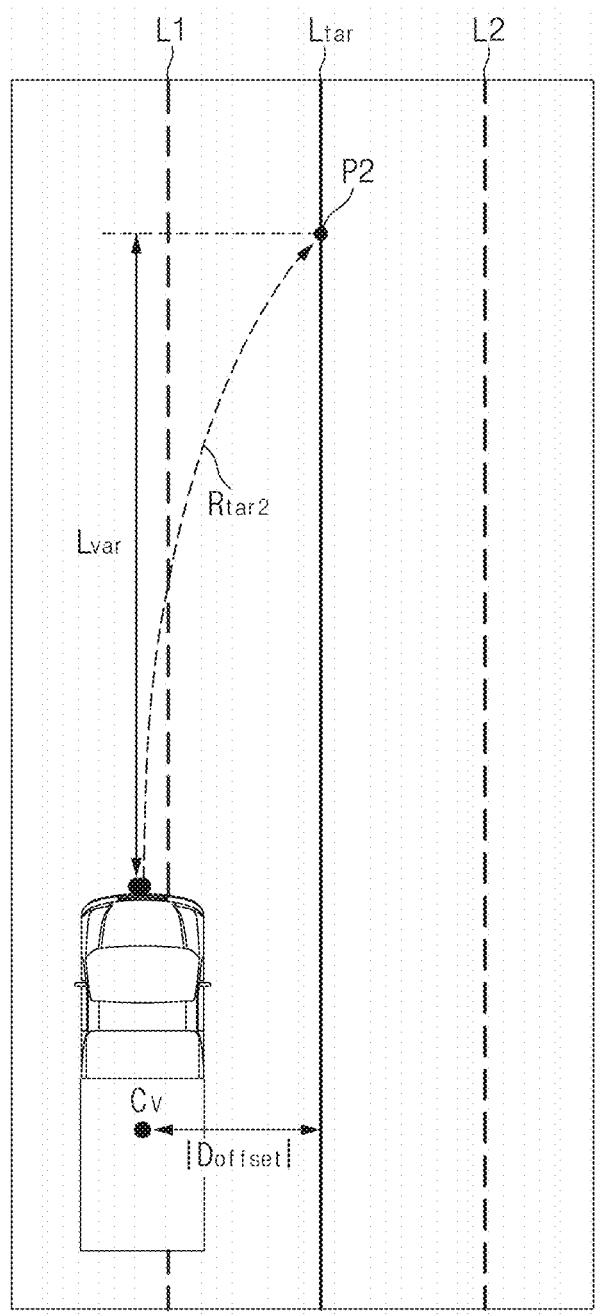
FIG. 4 is a drawing illustrating another example of control of an LFA apparatus according to embodiments of the present disclosure.

FIG. 4 is a drawing illustrating another example of control of an LFA apparatus according to embodiments of the present disclosure.

A processor 130 of FIG. 1 may obtain an image in front of a vehicle using a camera 110 of FIG. 1 and may recognize both lines L1 and L2 of a lane on which the vehicle should travel from the obtained image. The processor 130 may set a target route $L_{tar}$ along the center of both the lines L1 and L2.

The processor 130 may compute a vehicle offset $|D_{offset}|$, which is a distance between the target route $L_{tar}$ and a vehicle center Cv. When the vehicle offset $|D_{offset}|$ is greater than a threshold, the processor 130 may compute a difference between the vehicle offset $|D_{offset}|$ and the threshold. The processor 130 may adjust a preview time based on the difference between the vehicle offset $|D_{offset}|$ and the threshold. The processor 130 may calculate a target look-ahead distance $L_{var}$ based on the adjusted preview time and a vehicle speed. The processor 130 may set a target look-ahead distance point P2 on the target route $L_{tar}$ based on the target look-ahead distance $L_{inv}$. The target look-ahead distance $L_{var}$ computed in the present embodiment may be more increased than a target look-ahead distance $L_{inv}$ shown in FIG. 3.

The processor 130 may generate a target rotation route $R_{tar2}$ where the vehicle arrives at the target look-ahead distance point P2. Thereafter, the processor 130 may control a behavior (e.g., steering) of the vehicle along the target rotation route $R_{tar2}$.

Figure 5:
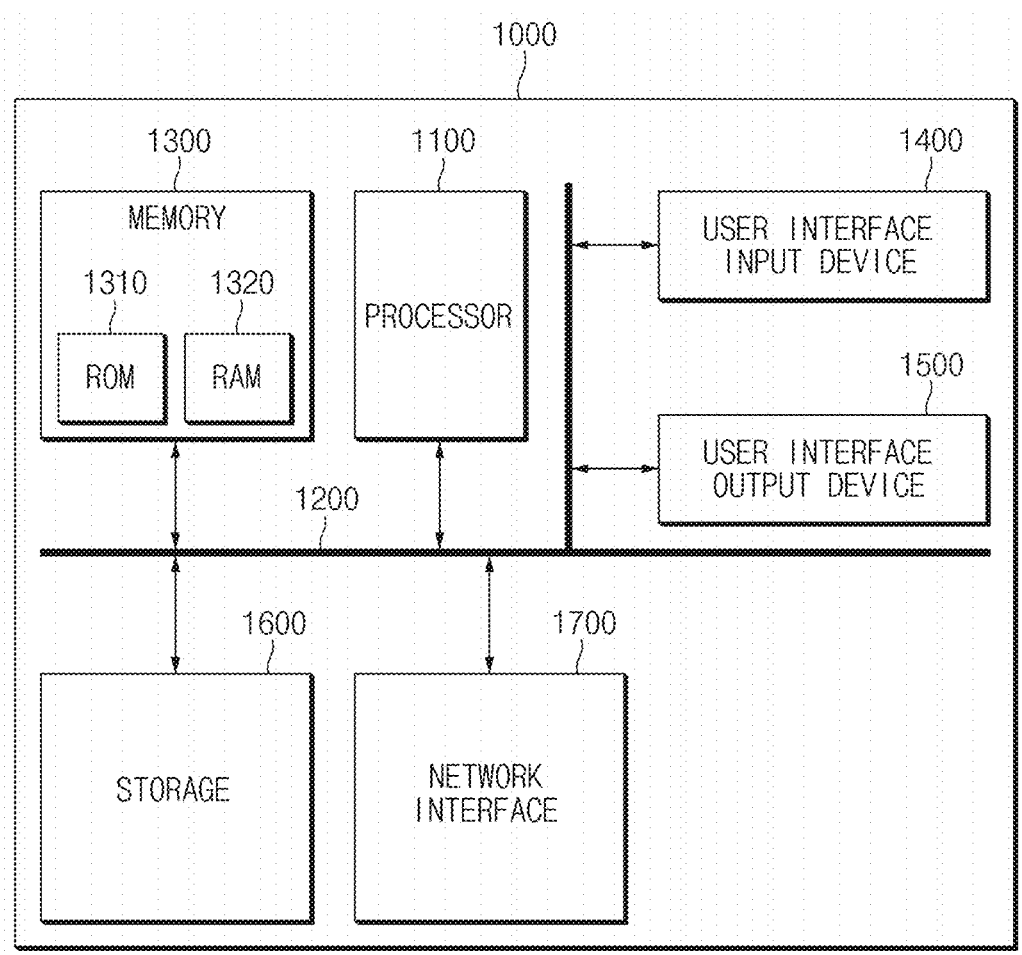
FIG. 5 is a block diagram illustrating a computing system for executing an LFA control method according to embodiments of the present disclosure.

FIG. 5 is a block diagram illustrating a computing system for executing an LFA control method according to embodiments of the present disclosure.

Referring to FIG. 5, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware, in a software module executed by the processor 1100, or in a combination thereof. The software module may reside on a storage medium (i.e., the memory 1300 and/or the storage 1600) such as a RAM, a flash memory, a ROM, an EPROM, an EEPROM, a register, a hard disk, a removable disk, and a CD-ROM. The storage medium may be coupled to the processor, and the processor may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to embodiments of the present disclosure, the lane following assist apparatus or LFA may increase a preview time depending on an offset degree to which the vehicle is spaced apart from a target route and on a vehicle speed when setting a target look-ahead distance to vary the target look-ahead distance, thus controlling a target route entrance angle of the vehicle. By controlling such an entrance angle, the lane following assist apparatus may prevent overshoot due to an excessive entrance angle when the vehicle enters a target route, such that the vehicle may enter the target route at a smooth angle.

Hereinabove, although the present disclosure has been described with reference to several embodiments and the accompanying drawings, the present disclosure is not limited thereto. The embodiments may be variously modified and altered by those having ordinary skill in the art to which the present disclosure pertains without departing from the spirit and scope of the present disclosure claimed in the following claims. Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A lane following assist apparatus, comprising:
   a camera configured to capture an image in front of a vehicle; and
   a processor configured to receive a forward image from the camera,
   wherein the processor is configured to:
   obtain line information from the forward image;
   calculate a straight distance between a target traveling route and a center of a vehicle as a vehicle offset based on the line information, wherein the target traveling route is set along the center of both lines of a lane on which the vehicle should travel;
   calculate a difference between the vehicle offset and a predetermined threshold when the vehicle offset is greater than a predetermined threshold;
   change a previously set preview time based on the calculated difference;
   set a target look-ahead distance based on the changed preview time and a vehicle speed; and
   perform lane following assist control using the target look-ahead distance.

2. The lane following assist apparatus of claim 1, wherein the processor calculates a straight distance between the target traveling route and a center of the vehicle as the vehicle offset.

3. The lane following assist apparatus of claim 1, wherein the processor sets a target look-ahead distance point using the target look-ahead distance and generates a target rotation route for arriving at the target look-ahead distance point.

4. A control method of a lane following assist apparatus, the control method comprising:
   obtaining line information from a forward image obtained using a camera;
   calculating a straight distance between a target traveling route and a center of the vehicle as a vehicle offset based on the line information, wherein the target traveling route is set along the center of both lines of a lane on which the vehicle should travel;
   computing a difference between the vehicle offset and a predetermined threshold when the vehicle offset is greater than the predetermined threshold;
   changing a previously set preview time based on the calculated difference;
   setting a target look-ahead distance based on the changed preview time and a vehicle speed; and
   performing lane following assist control using the target look-ahead distance.

5. The control method of claim 4, wherein the obtaining of the line information includes:
   recognizing both lines of a lane from the forward image and setting a lane center as a target traveling route.

6. The control method of claim 4, wherein the performing of the lane following assist control includes:
   setting a target look-ahead distance point using the target look-ahead distance; and
   generating a target rotation route for arriving at the target look-ahead distance point.

\* \* \* \* \*